United States Patent
Tanaka

(10) Patent No.: US 8,692,951 B2
(45) Date of Patent: Apr. 8, 2014

(54) BEZEL ATTACHMENT STRUCTURE AND LIQUID CRYSTAL MODULE

(75) Inventor: Kazuya Tanaka, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 581 days.

(21) Appl. No.: 12/971,047

(22) Filed: Dec. 17, 2010

(65) Prior Publication Data

US 2011/0149196 A1    Jun. 23, 2011

(30) Foreign Application Priority Data

Dec. 22, 2009  (JP) ................................ 2009-290588

(51) Int. Cl.
*G02F 1/1333* (2006.01)
*F21V 7/04* (2006.01)

(52) U.S. Cl.
USPC .............. 349/58; 362/632; 362/633; 362/634

(58) Field of Classification Search
USPC ................................ 349/58–67; 362/632–634
See application file for complete search history.

(56) References Cited

U.S. PATENT DOCUMENTS

| 6,654,078 B1 | 11/2003 | Kato et al. | |
| 2005/0110917 A1* | 5/2005 | Shida | 349/58 |
| 2006/0072299 A1* | 4/2006 | Lai | 362/29 |
| 2007/0008452 A1* | 1/2007 | Kim et al. | 349/58 |
| 2007/0171323 A1* | 7/2007 | Lin | 349/58 |
| 2008/0170416 A1* | 7/2008 | Yuan et al. | 362/633 |
| 2010/0061120 A1* | 3/2010 | Lin et al. | 362/633 |

FOREIGN PATENT DOCUMENTS

| JP | 8-5998 A | 1/1996 |
| JP | 10-215076 A | 8/1998 |

OTHER PUBLICATIONS

European Search Report of corresponding EP Application No. 10 19 6251.2 dated May 26, 2011.

* cited by examiner

*Primary Examiner* — Bumsuk Won
*Assistant Examiner* — Charles Chang
(74) *Attorney, Agent, or Firm* — Global IP Counselors, LLP

(57) ABSTRACT

A bezel attachment structure includes a frame and a bezel. The frame includes a side face, a plurality of first engaging components, and a second engaging component. The bezel component includes a side plate, a plurality of first engaged components, a plurality of contact components, and a second engaged component. The first engaged components engage the first engaging components, respectively, such that the bezel component is prevented from moving relative to the side face both in upward and downward directions and in inward and outward directions. The contact components engage the first engaging components, respectively, such that the bezel component is prevented from moving relative to the side face in a first lengthwise direction. The second engaged component engages the second engaging component such that the bezel component is prevented from moving relative to the side face in a second lengthwise direction.

14 Claims, 4 Drawing Sheets

BEZEL ATTACHMENT STRUCTURE AND LIQUID CRYSTAL MODULE

CROSS-REFERENCE TO RELATED APPLICATIONS

This application claims priority to Japanese Patent Application No. 2009-290588 filed on Dec. 22, 2009. The entire disclosure of Japanese Patent Application No. 2009-290588 is hereby incorporated herein by reference.

BACKGROUND

1. Field of the Invention

The present invention generally relates to a bezel attachment structure. More specifically, the present invention relates to a bezel attachment structure for a liquid crystal module.

2. Background Information

With a conventional four-piece divisible bezel for a liquid crystal module, the bezel is typically fitted to a frame for a backlight, and then the bezel is fixed to the frame with screws.

There is a known conventional display device. With the conventional display device, protrusions in the form of right triangles are formed on an outer peripheral face of a stage where a backlight unit is fixed. Engagement holes corresponding to the protrusions are formed in side faces of a one-piece bezel with a rectangular shape. The protrusions of the stage are engaged with the engagement holes in the bezel so that the bezel is attached to the stage without the use of screws (see Japanese Laid-Open Patent Application Publication No. H8-5998, for example).

There is also a known conventional wall-hung apparatus. With the conventional wall-hung apparatus, a plurality of latching holes formed in a rear face of a device housing is latched from above onto a plurality of upward-facing hooks formed in a wall-hung apparatus main body. Engagement concave components and protrusions are provided to a lower part of the device housing and to a lower part of the wall-hung apparatus main body as locking means for preventing upward movement of the device housing so that the latching holes will not move away from the hooks. The engagement concave components and the protrusions are engaged with each other so that the device housing is attached to the wall-hung apparatus main body without the use of screws (see Japanese Laid-Open Patent Application Publication No. H10-215076, for example).

SUMMARY

It has been discovered that, with a conventional liquid crystal module, since the four-piece divisible bezel is fitted to the frame of the backlight and attached with screws, threading in the screws takes extra time and more parts and assembly steps are required, which drives up the cost.

Furthermore, it has been discovered that, even if a structure of the conventional display device is employed for the four-piece divisible bezel of the conventional liquid crystal module, the four-piece divisible bezel cannot be fixed to the frame in inside and outside directions of the frame. Thus, the four-piece divisible bezel cannot be attached so that the bezel will not fall off.

Moreover, it has also been discovered that, even if an attachment structure of the wall-hung apparatus is employed for the four-piece divisible bezel of the conventional liquid crystal module, the lower part of the four-piece divisible bezel tends to lift up. Furthermore, since the engagement concave components of the locking means tends to move away from the protrusions, there is the risk that the four-piece divisible bezel will separate from the frame if subjected to an impact. Moreover, there is the risk that engagement looseness between the protrusions and the engagement concave components of the locking means will cause chatter.

An improved bezel attachment structure was conceived in light of the above-mentioned problem. One object of the present disclosure is to provide a bezel attachment structure with which a bezel component is securely attached to a frame without the use of screws.

In accordance with one aspect of the present disclosure, a bezel attachment structure for a liquid crystal module includes a frame and a bezel. The frame includes a side face, a plurality of first engaging components, and a second engaging component. The first engaging components are formed on the side face. The second engaging component is formed at one end portion of the side face. The bezel component is attached to the side face of the frame. The bezel component includes a side plate, a plurality of first engaged components, a plurality of contact components, and a second engaged component. The side plate is disposed on the side face of the frame. The first engaged components are formed on the side plate. The first engaged components engage the first engaging components of the frame, respectively, such that the bezel component is prevented from moving relative to the side face of the frame both in upward and downward directions of the frame and in inward and outward directions of the frame with the inward and outward directions being perpendicular to the upward and downward directions of the frame. The contact components are formed on the side plate. The contact components engage the first engaging components of the frame, respectively, such that the bezel component is prevented from moving relative to the side face of the frame in a first lengthwise direction of the frame with the first lengthwise direction being perpendicular to both the upward and down directions and the inward and outward directions. The second engaged component is formed at one end portion of the side plate. The second engaged component engages the second engaging component such that the bezel component is prevented from moving relative to the side face of the frame in a second lengthwise direction of the frame. The second lengthwise direction is opposite to the first lengthwise direction of the frame. The second lengthwise direction directs from the one end portion of the side face of the frame toward the other end portion of the side face of the frame.

With the bezel attachment structure, it is possible to provide a bezel attachment structure with which a bezel component is securely attached to a frame without the use of screws.

These and other objects, features, aspects and advantages will become apparent to those skilled in the art from the following detailed description, which, taken in conjunction with the annexed drawings, discloses a preferred embodiment.

BRIEF DESCRIPTION OF THE DRAWINGS

Referring now to the attached drawings which form a part of this original disclosure.

DETAILED DESCRIPTION OF EMBODIMENTS

A preferred embodiment will now be explained with reference to the drawings. It will be apparent to those skilled in the art from these disclosures that the following descriptions of the preferred embodiment are provided for illustration only and not for the purpose of limiting the invention as defined by the appended claims and their equivalents.

Figure 1:
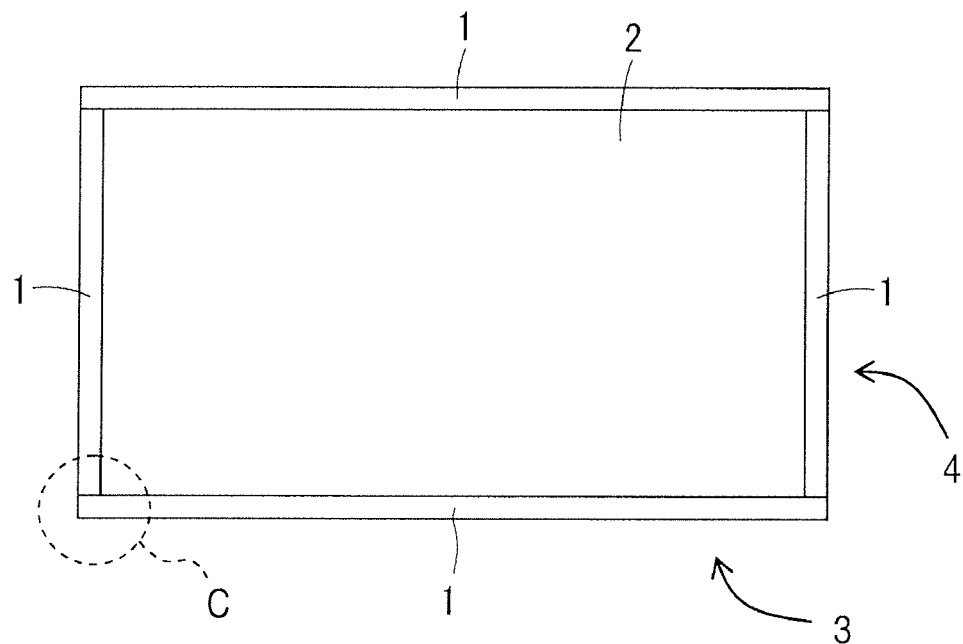
FIG. 1 is a front elevational view of a liquid crystal module in accordance with one embodiment.
Figure 3:
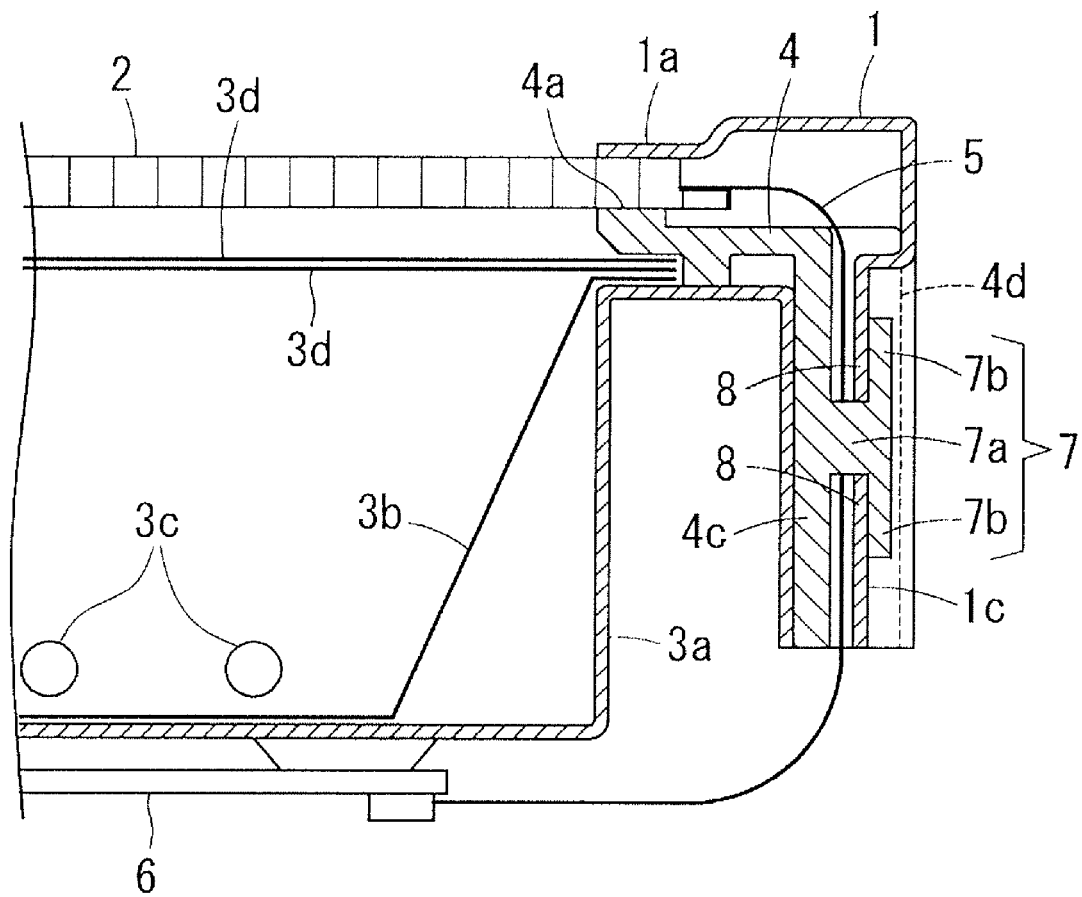
FIG. 3 is a partial cross sectional view of the liquid crystal module taken along III-III line in FIG. 2.

As seen in FIGS. 1 and 3, a liquid crystal module has a plurality of bezel components (e.g., two long bezel components and two short bezel components) 1, a liquid crystal panel 2, a backlight device (e.g., backlight unit) 3 and a synthetic resin frame 4. The backlight device 3 has a rear frame 3a, a light reflecting sheet 3b, a plurality of U-shaped cold cathode tubes 3c, and a plurality of light diffusing sheets 3d. The bezel components 1 form a rectangular four-piece divisible bezel that holds down an edge portion of the liquid crystal panel 2 when the bezel components 1 are coupled to the frame 4. Each of the bezel components 1 includes a front plate with an inner end edge portion 1a and a side plate 1b. The bezel components 1 are attached to four side faces 4c of the frame 4 that surrounds the backlight device 3 without the use of screws. Four edge portions around the liquid crystal panel 2 are surrounded by the bezel components 1. The liquid crystal module includes a bezel attachment structure for attaching the bezel components 1 to the frame 4.

Figure 4:
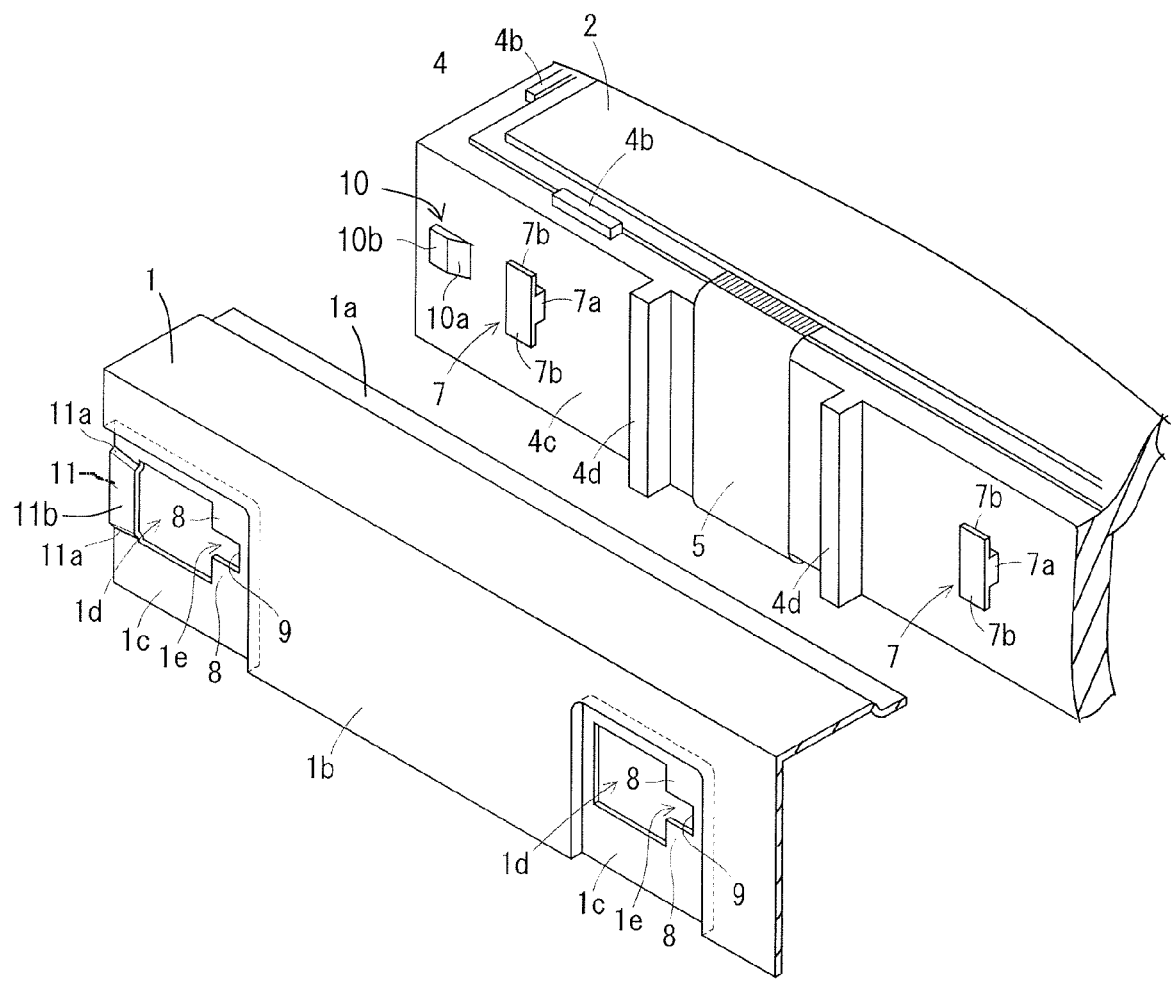
FIG. 4 is an enlarged, partial exploded perspective view of the liquid crystal module illustrated in FIG. 1.

As seen in FIG. 3, with the backlight device 3, the rear frame 3a is made of sheet metal, and formed in a shallow box shape. The light reflecting sheet 3b is provided inside the rear frame 3a. The U-shaped cold cathode tubes 3c are installed above the light reflecting sheet 3b as a light source. Four edge portions around the light diffusing sheets 3d are superposed as optical sheets. The frame 4 is attached to four side faces of the rear frame 3a. The frame 4 includes panel supports 4a, a plurality of positioning ribs 4b, the side faces 4c, and a plurality of support ribs 4d. The edge portions of the light diffusing sheets 3d are held down by inner end edge portions of the frame 4. The four edge portions around the liquid crystal panel 2 are disposed on the panel supports 4a formed on the inner end edge portions of the frame 4. The edge portions of the liquid crystal panel 2 are held down by the inner end edge portions 1a of the front plate of the bezel components 1 attached to the four side faces 4c of the frame 4. As seen in FIG. 4, the liquid crystal panel 2 is positioned by the positioning ribs 4b formed on an upper face of the frame 4.

As seen in FIGS. 3 and 4, the support ribs 4d support the side plates 1b of the bezel components 1 from inside of the liquid crystal module (i.e., rear side of the side plates 1b). The support ribs 4d are formed spaced apart locations on the side faces 4c of the frame 4. A flexible wiring board 5 is connected to the liquid crystal panel 2, and is taken out through the spaces between the support ribs 4d to a lower side of the rear frame 3a. Furthermore, as seen in FIG. 3, the flexible wiring board 5 is connected to a substrate 6 attached to a lower face (i.e., rear face) of the rear frame 3a.

Figure 5A:
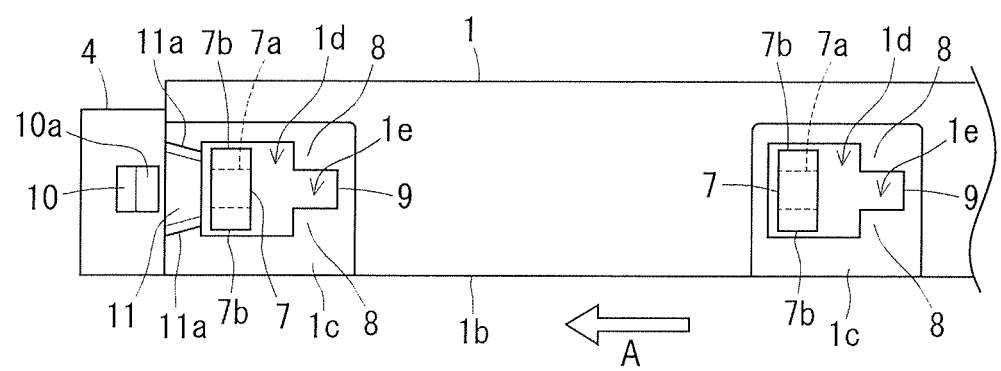
FIG. 5A is a partial plan view of the liquid crystal module illustrating an initial state of an attachment of a bezel component of the liquid crystal module relative to a frame of the liquid crystal module.
Figure 5B:
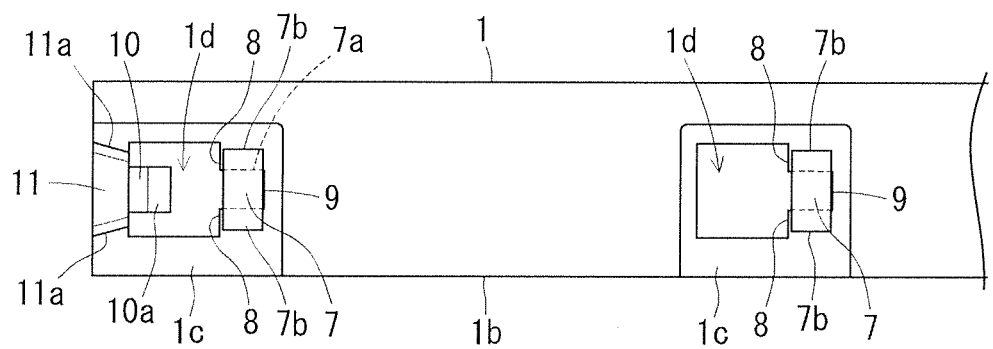
FIG. 5B is a partial plan view of the liquid crystal module illustrating a final state of the attachment of the bezel component relative to the frame.

As seen in FIGS. 2, 4, 5A and 5B, the side faces 4c of the frame 4 and the side plates 1b of the bezel components 1 include a plurality of sets of a first engaging component 7 and a first engaged component 8. The first engaging component 7 and the first engaged component 8 engage with each other in up and down directions (e.g., upward and downward directions of the frame 4) and forward and backward directions (e.g., inward and outward directions of the frame 4) as seen in FIG. 5B. The up and down directions are perpendicular to the forward and backward directions. As a result, the bezel components 1 are prevented from moving in the up and down directions and the forward and backward directions relative to the frame 4 when the bezel components 1 are superposed over the frame 4 as seen in FIG. 5A and slid to the left (a direction indicated by an arrow A in FIG. 5A, e.g., first lengthwise direction of the side faces 4 of the frame 4) along a lengthwise direction of the bezel components 1. The lengthwise direction is perpendicular to both the up and down directions and the forward and backward directions. The sets of the first engaging component 7 and the first engaged component 8 are formed spaced apart locations on the side plates 1b of the bezel components 1 and the side faces 4c of the frame 4, respectively. The side plates 1b of the bezel components 1 further include a plurality of contact components 9 at locations near the first engaged components 8. The contact components 9 hit the first engaging components 7 and halt the slide of the bezel components 1 when the bezel components 1 are slid to the left as described above.

Figure 2:
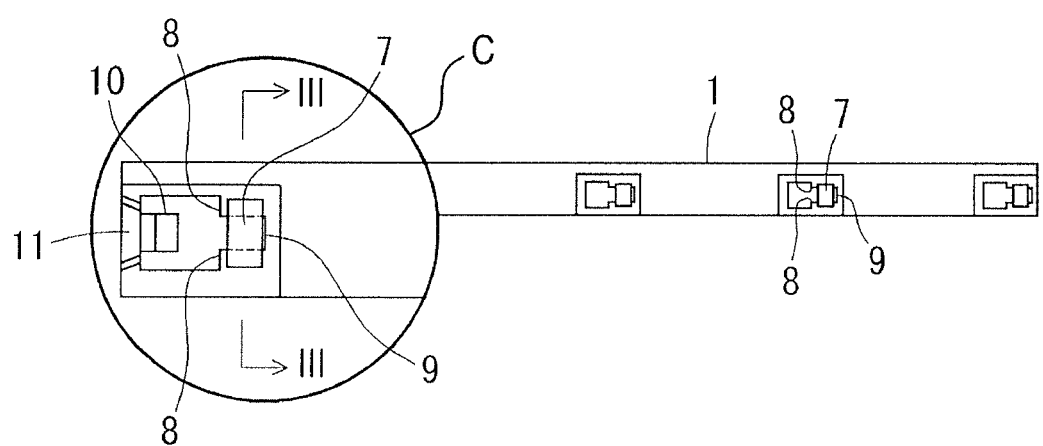
FIG. 2 is a bottom plan view of the liquid crystal module illustrated in FIG. 1 with an enlarged, partial bottom view of an attachment structure of the liquid crystal module in a circle C in FIG. 1.

As seen in FIGS. 3 and 4, the first engaging components 7 are laterally T-shaped engaging components formed on the side faces 4c of the frame 4. As seen in FIG. 2, each of the side faces 4c has four first engaging components 7. Each of the first engaging components 7 has a supporting base 7a and a hold-down (e.g., retainer plate) 7b. The supporting bases 7a are formed on the four side faces 4c of the frame 4, respectively. The supporting bases 7a protrude from the side faces 4c of the frame 4, respectively. The hold-downs 7b extend in the up and down directions from front end portions (e.g., distal end portions) of the supporting bases 7a, respectively. Meanwhile, each of the side plates 1b of the bezel components 1 has a plurality of concave components (e.g., stepped portion) 1c at spaced apart locations on each of outer faces of the side plates 1b that correspond to the first engaging components 7, respectively. Each of the concave components 1c has a bottom portion with an opening (e.g., wide opening portion) 1d and a cut-out groove (e.g., narrow opening portion) 1e. The opening 1d and the cut-out groove 1e are formed as one hole. The bottom portions are located inward of the liquid crystal module relative to the outer faces of the side plates 1b, respectively. The openings 1d allow the first engaging components 7 to pass through. The cut-out grooves 1e extend from the openings 1d in the opposite direction (e.g., second lengthwise direction) to the right from the sliding direction (e.g., first lengthwise direction) of the bezel components 1 and are used to guide the supporting bases 7a. Upper and lower end edge parts of each of the cut-out grooves 1e form each of the first engaged components 8 that are engaged in the up and down direction and the forward and backward direction with the supporting bases 7a and the hold-downs 7b of the first engaging components 7. The inner end portions (e.g., side end faces or right ends) of the cut-out grooves 1e form the contact components 9 that hit the supporting bases 7a of the first engaging components 7 and halt the slide of the bezel components 1.

As seen in FIGS. 2, 4, 5A and 5B, each of the side faces 4c of the frame 4 includes a second engaging component 10 at a left end portion (e.g., one end portion) of each of the side faces 4c. Furthermore, each of the side plates 1b of the bezel components 1 includes a second engaged component 11 at a left end portion (e.g., one end portion) of each of the side plates 1b. The second engaging component 10 and the second engaged component 11 engage with each other, and prevent the bezel components 1 from being slid in the opposite direction (e.g., second lengthwise direction) to the right when the bezel components 1 have been slide to the left along their lengthwise direction. Each of the second engaging components 10 has a flattered convex rib 10b with an inclined face 10a. The inclined faces 10a are formed as right side faces of the flattened convex ribs 10b, respectively. Meanwhile, each of the second engaged components 11 has a bridge 11b. The bridges 11b bulge from and are lifted up slightly at the left side edge portions (e.g., side edge part) of the openings 1d formed at the left end portions of the side plates 1b of the bezel components 1, respectively. Convex rib guide slopes (e.g., upper and lower guide slope parts) that spread out in the sliding direction to the left of the bezel components 1 are provided to upper and lower end portions (e.g., upper and lower ends) 11a of the bridges 11b. In other words, width in the upper or lower direction between the convex rib guide slopes increases as approaching in the sliding direction.

The bezel components 1 are attached to the four side faces 4c of the frame 4 in the following manner.

Each of the bezel components 1 is attached to the frame 4 in the same manner one by one. First, as seen in FIG. 5A, one of the bezel components 1 is superposed with one of the side faces 4c of the frame 4, being shifted more to the right side than the convex rib (e.g., second engaging component 10) 10b at the left end portion of the one of the side faces 4c of the frame 4. The side plate 1b of the bezel component 1 is pressed against the support ribs 4d of the side face 4c so that the hold-downs 7b of the first engaging components 7 stick out forward (outward) through the openings 1d in the bezel component 1, respectively.

Then, the bezel component 1 is slid to the left along the lengthwise direction of the bezel component 1. As a result, as seen in FIG. 5B, the supporting bases 7a of the first engaging components 7 are relatively guided into the cut-out grooves 1e of the bezel component 1, respectively. The supporting bases 7a of the first engaging components 7 engage in the up and down directions with the upper and lower edge parts of the cut-out grooves 1e (e.g., first engaged components 8), respectively. The hold-downs 7b of the first engaging components 7 engage in the forward and backward directions with the first engaged components 8. The bezel component 1 is prevented from moving in the up and down directions and in the forward and backward directions relative to the frame 4. Furthermore, the inner end portions of the cut-out grooves 1e (e.g., the contact components 9) of the bezel component 1 contact with the supporting bases 7a of the first engaging components 7, respectively, which halts the slide of the bezel component 1 to the left. The convex rib 10b (e.g., second engaging component 10) and the bridge 11b (e.g., second engaged component 11) that has ridden up and over the convex rib 10b are engaged with each other, which reliably prevents the bezel component 1 from sliding in the opposite direction to the right.

Thus, one of the bezel components 1 is attached to one of the side faces 4c of the frame 4 in a state of being fixed so as not to move in the up and down directions, the forward and backward directions, and the left and right directions relative to the frame 4. The other three bezel components 1 are attached to the other three side faces 4c of the frame 4 in the same manner as above.

With the bezel attachment structure, the four-piece divisible bezel can be securely attached and fixed to the four side faces 4c of the frame 4 by an extremely simple operation involving just sliding the bezel components 1 to the left, without the use of screws. Thus, assembly work is much easier. Furthermore, not having to use screws means that there are fewer parts and assembly steps, which affords a lower cost. Moreover, the bezel attachment structure is such that the first engaging components 7 have the hold-downs 7b that extend up and down from the front end portions of the supporting bases 7a, and the first engaged components 8 have the upper and lower edge parts of the cut-out grooves 1e used for guiding the supporting bases 7a. Thus, the first engaging components 7 and the first engaged components 8 are engaged in the up and down directions and the forward and backward directions without any looseness in the up and down directions and the forward and backward directions. Therefore, an advantage is that this improves the attachment stability of the bezel components 1 relative to the frame 4. Also, since the convex rib guide slopes are provided to the upper and lower end portions 11a of the bridges 11b (e.g., second engaged components 11), respectively, and the side faces of the convex ribs 10b (e.g., second engaging components 10) are inclined, the bridges 11b can ride smoothly up and over the convex ribs 10b, which means that the bezel components 1 are even easier to slide, and wear or damage to the convex ribs 10b can also be prevented. Also, since the first engaged components 8 and the second engaged components 11 are formed in the concave components 1c of the side plates 1b of the bezel components 1, the first engaging components 7 and the second engaging components 10 do not stick out from the side plates 1b of the bezel components 1.

With the liquid crystal module, when the bezel components 1 are slid to the left along their lengthwise direction, the first engaging components 7 and the first engaged components 8 engage in the up and down directions and the forward and backward directions, the contact components 9 hit the first engaging components 7, and the second engaging components 10 and the second engaged components 11 engage with each other. However, the configuration can also be reversed, so that when the bezel components 1 are slid to the right along their lengthwise direction, the first engaging components 7 and the first engaged components 8 engage in the up and down directions and the forward and backward directions, the contact components 9 hit the first engaging components 7, and the second engaging components 10 and the second engaged components 11 engage with each other. In other words, the configuration can be such that the engagement and contact are as mentioned above when the bezel components 1 are slid in one direction (left or right) along their lengthwise direction.

GENERAL INTERPRETATION OF TERMS

In understanding the scope of the present invention, the term "comprising" and its derivatives, as used herein, are intended to be open ended terms that specify the presence of the stated features, elements, components and groups, but do not exclude the presence of other unstated features, elements, components and groups. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, the following directional terms "forward, rearward, above, downward, vertical, horizontal, below and transverse" as well as any other similar directional terms refer to those directions of a liquid crystal module equipped with the present invention. Accordingly, these terms, as utilized to describe the present invention should be interpreted relative to a liquid crystal module equipped with the present invention as used in the normal operating position.

While a preferred embodiment have been chosen to illustrate the present invention, it will be apparent to those skilled in the art from these disclosures that various changes and modifications can be made herein without departing from the scope of the invention as defined in the appended claims. Furthermore, the foregoing descriptions of the preferred embodiment according to the present invention are provided for illustration only, and not for the purpose of limiting the invention as defined by the appended claims and their equivalents.

What is claimed is:

1. A bezel attachment structure for a liquid crystal module, the bezel attachment structure comprising:
   a frame including
      a plurality of side faces,
      a plurality of first engaging components formed on each of the side faces, and
      a second engaging component formed at one end portion of each of the side faces; and
   a plurality of bezel components attached to the side faces of the frame, respectively, the bezel components being independently formed as separate members, each of the bezel components including
      a side plate disposed on respective one of the side faces of the frame,
      a plurality of first engaged components formed on the side plate, the first engaged components engaging the first engaging components of the frame, respectively, such that each of the bezel components is prevented from moving relative to the respective one of the side faces of the frame both in upward and downward directions of the frame and in inward and outward directions of the frame, the inward and outward directions being perpendicular to the upward and downward directions of the frame,
      a plurality of contact components formed on the side plate, the contact components engaging the first engaging components of the frame, respectively, such that each of the bezel components is prevented from moving relative to the respective one of the side faces of the frame in a first lengthwise direction of the respective one of the side faces of the frame, the first lengthwise direction being perpendicular to both the upward and downward directions and the inward and outward directions, and
      a second engaged component formed at one end portion of the side plate, the second engaged component engaging the second engaging component such that each of the bezel components is prevented from moving relative to the respective one of the side faces of the frame in a second lengthwise direction of the respective one of the side faces of the frame, the second lengthwise direction being opposite to the first lengthwise direction of the frame, the second lengthwise direction directing from the one end portion of the respective one of the side faces of the frame toward the other end portion of the respective one of the side faces of the frame.

2. A liquid crystal module comprising:
   a bezel attachment structure in accordance with claim 1;
   a backlight unit attached to the frame of the bezel attachment structure; and
   a liquid crystal panel disposed on the frame of the bezel attachment structure,
   the bezel components of the bezel attachment structure holding down a plurality of edge portions of the liquid crystal panel from above, respectively.

3. A bezel attachment structure for a liquid crystal module, the bezel attachment structure comprising:
   a frame including
      a side face,
      a plurality of first engaging components formed on the side face, and
      a second engaging component formed at one end portion of the side face; and
   a bezel component attached to the side face of the frame, the bezel component including
      a side plate disposed on the side face of the frame,
      a plurality of first engaged components formed on the side plate, the first engaged components engaging the first engaging components of the frame, respectively, such that the bezel component is prevented from moving relative to the side face of the frame both in upward and downward directions of the frame and in inward and outward directions of the frame, the inward and outward directions being perpendicular to the upward and downward directions of the frame,
      a plurality of contact components formed on the side plate, the contact components engaging the first engaging components of the frame, respectively, such that the bezel component is prevented from moving relative to the side face of the frame in a first lengthwise direction of the frame, the first lengthwise direction being perpendicular to both the upward and downward directions and the inward and outward directions, and
      a second engaged component formed at one end portion of the side plate, the second engaged component engaging the second engaging component such that the bezel component is prevented from moving relative to the side face of the frame in a second lengthwise direction of the frame, the second lengthwise direction being opposite to the first lengthwise direction of the frame, the second lengthwise direction directing from the one end portion of the side face of the frame toward the other end portion of the side face of the frame,
   the side plate of the bezel component including a plurality of openings, each of the openings having a wide opening portion and a narrow opening portion that is narrower than the wide opening portion, the narrow opening portion extending from the wide opening portion in the second lengthwise direction,
   each of the first engaging components of the frame including a supporting base that protrudes from the side face of the frame with the supporting base disposed through the narrow opening portion of the side face, and a retainer plate that extends in the upward and downward directions from a distal end portion of the supporting base,
   each of the first engaged components of the bezel component including upper and lower edge parts of the narrow opening portion of the side face, and
   each of the contact components of the bezel component including a side end face of the narrow opening portion of the side face.

4. The bezel attachment structure according to claim 3, wherein
   the supporting base engages upper and lower side faces of the narrow opening portion, the supporting base further engaging the side end face of the narrow opening portion, and the retainer plate engages the upper and lower edge parts of the narrow opening portion.

5. The bezel attachment structure according to claim 3, wherein
the second engaging component of the frame includes a convex rib that is formed at the one end portion of the side face of the frame, and
the second engaged component of the bezel component includes a bridge part that bulges from a side edge part of the wide opening portion in the outward direction of the frame relative to the side edge part of the wide opening portion.

6. The bezel attachment structure according to claim 5, wherein
the convex rib engages the bridge part.

7. The bezel attachment structure according to claim 5, wherein
the second engaged component of the bezel component further includes upper and lower guide slope parts that are formed at upper and lower ends of the bridge part, width between the upper and lower guide slope part increasing as approaching in the first lengthwise direction of the frame.

8. The bezel attachment structure according to claim 3, wherein
the side plate of the bezel component further includes an outer face and a plurality of stepped portions that is formed in the outer face, the stepped portions having bottoms with the openings, respectively, the bottoms being located inward of the frame relative to the outer face.

9. A liquid crystal module comprising:
a backlight unit;
a frame attached to the backlight unit, the frame including a side face,
a plurality of first engaging components formed on the side face, and
a second engaging component formed at one end portion of the side face;
a liquid crystal panel disposed on the frame; and
a bezel component attached to the side face of the frame and holding down a edge portion of the liquid crystal panel from above, the bezel component including
a side plate disposed on the side face of the frame,
a plurality of first engaged components formed on the side plate, the first engaged components engaging the first engaging components of the frame, respectively, such that the bezel component is prevented from moving relative to the side face of the frame both in upward and downward directions of the frame and in inward and outward directions of the frame, the inward and outward directions being perpendicular to the upward and downward directions of the frame,
a plurality of contact components formed on the side plate, the contact components engaging the first engaging components of the frame, respectively, such that the bezel component is prevented from moving relative to the side face of the frame in a first lengthwise direction of the frame, the first lengthwise direction being perpendicular to both the upward and downward directions and the inward and outward directions, and
a second engaged component formed at one end portion of the side plate, the second engaged component engaging the second engaging component such that the bezel component is prevented from moving relative to the side face of the frame in a second lengthwise direction of the frame, the second lengthwise direction being opposite to the first lengthwise direction of the frame, the second lengthwise direction directing from the one end portion of the side face of the frame toward the other end portion of the side face of the frame,
the side plate of the bezel component including a plurality of openings, each of the openings having a wide opening portion and a narrow opening portion that is narrower than the wide opening portion, the narrow opening portion extending from the wide opening portion in the second lengthwise direction,
each of the first engaging components of the frame including a supporting base that protrudes from the side face of the frame with the supporting base disposed through the narrow opening portion of the side face, and a retainer plate that extends in the upward and downward directions from a distal end portion of the supporting base,
each of the first engaged components of the bezel component including upper and lower edge parts of the narrow opening portion of the side face, and
each of the contact components of the bezel component including a side end face of the narrow opening portion of the side face.

10. The liquid crystal module according to claim 9, wherein
the supporting base engages upper and lower side faces of the narrow opening portion, the supporting base further engaging the side end face of the narrow opening portion, and
the retainer plate engages the upper and lower edge parts of the narrow opening portion.

11. The liquid crystal module according to claim 9, wherein
the second engaging component of the frame includes a convex rib that is formed at the one end portion of the side face of the frame, and
the second engaged component of the bezel component includes a bridge part that bulges from a side edge part of the wide opening portion in the outward direction of the frame relative to the side edge part of the wide opening portion.

12. The liquid crystal module according to claim 11, wherein
the convex rib engages the bridge part.

13. The liquid crystal module according to claim 11, wherein
the second engaged component of the bezel component further includes upper and lower guide slope parts that are formed at upper and lower ends of the bridge part, width between the upper and lower guide slope part increasing as approaching in the first lengthwise direction of the frame.

14. The liquid crystal module according to claim 9, wherein
the side plate of the bezel component further includes an outer face and a plurality of stepped portions that is formed in the outer face, the stepped portions having bottoms with the openings, respectively, the bottoms being located inward of the frame relative to the outer face.

* * * * *